United States Patent
Agiwal et al.

(10) Patent No.: US 8,315,192 B2
(45) Date of Patent: Nov. 20, 2012

(54) METHOD AND SYSTEM FOR CONFIGURING A MEDIA ACCESS CONTROL HEADER TO REDUCE A HEADER OVERHEAD

(75) Inventors: Anil Agiwal, Bangalore (IN); Sung-Jin Lee, Bangalore (IN)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 361 days.

(21) Appl. No.: 12/625,753

(22) Filed: Nov. 25, 2009

(65) Prior Publication Data

US 2010/0128741 A1  May 27, 2010

(30) Foreign Application Priority Data

Nov. 27, 2008 (IN) .......................... 2977/CHE/2008

(51) Int. Cl.
*H04B 7/00* (2006.01)
(52) U.S. Cl. ....................................................... 370/310
(58) Field of Classification Search .................. 370/310, 370/328, 329, 349, 431, 464, 465
See application file for complete search history.

(56) References Cited

U.S. PATENT DOCUMENTS

| | | | |
|---|---|---|---|
| 7,746,842 B2* | 6/2010 | Sugaya | 370/349 |
| 7,974,312 B2* | 7/2011 | Ahmadi et al. | 370/477 |
| 2008/0123620 A1* | 5/2008 | Ko et al. | 370/349 |
| 2009/0141670 A1* | 6/2009 | Duncan Ho | 370/328 |
| 2010/0135495 A1* | 6/2010 | Chion et al. | 380/273 |
| 2011/0164586 A1* | 7/2011 | Kim et al. | 370/329 |

OTHER PUBLICATIONS

IEEE Standard 802.16e, Part 16, IEEE, Feb. 2006, 864 pages.*

* cited by examiner

*Primary Examiner* — Dmitry H Levitan
(74) *Attorney, Agent, or Firm* — Cha & Reiter, LLC (57) ABSTRACT

A method and system for configuring a media access control header to reduce a header overhead is provided. The method includes establishing a connection between a transmitter and a receiver. The method also includes determining a size of a length field in the MAC header of a MAC protocol data unit (PDU) of the connection based on one or more parameters. The method further includes transmitting the MAC PDU to the receiver. The system includes a transmitter to determine a size of a length field of the media access control (MAC) header based on one or more parameters and to transmit a MAC protocol data unit (PDU) having the MAC header to a receiver. The system also includes the receiver to receive the MAC PDU and to determine the size of the length field in the MAC header based on a connection identifier in the MAC header.

24 Claims, 8 Drawing Sheets

METHOD AND SYSTEM FOR CONFIGURING A MEDIA ACCESS CONTROL HEADER TO REDUCE A HEADER OVERHEAD

CLAIM OF PRIORITY

This patent application claims priority from Indian provisional patent application number 2977/CHE/2008, filed on Nov. 27, 2008 entitled "METHOD AND SYSTEM FOR CONFIGURING FLOW SPECIFIC LENGTH FIELD" and assigned to Samsung India Software Operations Private Limited, which is hereby incorporated in its entirety.

FIELD

The present disclosure relates generally to the field of wireless communication. More particularly, the present disclosure relates to a method and system for configuring a media access control header to reduce a header overhead.

BACKGROUND

Broadband wireless communication networks based on various standards, for example Institute for Electronic and Electrical Engineers (IEEE) 802.16e based Worldwide Interoperability for Microwave Access (WiMAX) standard and related evolved versions are widely deployed to provide various types of services, such as voice services and packet data services. Information generated by an application running in a mobile station and a base station in a broadband wireless communication network, undergo through various protocol layers of the broadband wireless communication system. Each protocol layer appends a header to the information received from a preceding protocol layer. As a result, a significant amount of header overhead due to one or more headers of the various protocol layers in the broadband wireless communication system gets added to the information during transmission.

Each application generates a different size of a payload. The payload corresponds to number of information bytes. Also, each application has a different upper limit on a size of the payload. In one example, a voice over internet protocol (VOIP) application generates a smaller payload compared to a file transfer protocol (FTP) that generates a larger payload. A media access control (MAC) layer in the broadband wireless communication system encapsulates the payload in a MAC protocol data unit. A MAC header of the MAC protocol data unit includes a length field to indicate size of a MAC layer packet. The MAC layer packet is carried in a physical layer packet. The size of the length field in the MAC header is fixed based on a maximum size of the payload among a plurality of payloads for different applications. The fixed size of the length field leads to the header overhead as some of the applications generate smaller payloads while other applications generate larger payloads.

In light of the foregoing discussion, there is a need for a method and system for configuring a media access control header, specific to requirements of an application, to reduce the header overhead.

SUMMARY

Embodiments of the present disclosure described herein provide a method and system for configuring a media access control header to reduce a header overhead.

An exemplary method for configuring a media access control header to reduce a header overhead includes establishing a connection between a transmitter and a receiver. The method further includes determining a size of a length field in the media access control (MAC) header of a MAC protocol data unit (PDU) of the connection based on one or more parameters by the transmitter. The method further includes transmitting the MAC PDU to the receiver.

Another exemplary method for configuring a media access control header to reduce a header overhead includes establishing a connection between a transmitter and a receiver. The method also includes determining the media access control (MAC) header of a MAC protocol data unit (PDU) of the connection from a plurality of MAC headers based on one or more parameters by the transmitter. Further, the method includes transmitting the MAC PDU to the receiver.

An exemplary system for configuring a media access control header to reduce a header overhead includes a transmitter to determine a size of a length field in the media access control (MAC) header based on one or more parameters and to transmit a MAC protocol data unit (PDU) having the MAC header to a receiver. The system also includes the receiver to receive the MAC PDU and to determine the size of the length field in the MAC header based on a connection identifier in the MAC header.

Another exemplary system for configuring a media access control header to reduce a header overhead includes a transmitter to determine the media access control (MAC) header from a plurality of MAC headers defined in a standard based on one or more parameters by the transmitter and to transmit a MAC protocol data unit (PDU) having the MAC header to a receiver. The system also includes the receiver to receive the MAC PDU and to determine the MAC header from the plurality of MAC headers based on a connection identifier in the MAC header.

BRIEF DESCRIPTION OF FIGURES

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for configuring a media access control (MAC) header to reduce a header overhead.

A MAC layer is one of various layers in a protocol architecture of a mobile station or a base station in a wireless communication system. The MAC layer controls transfer of data packets between the mobile station and the base station in a wireless network. The MAC layer encapsulates a data packet in a MAC protocol data unit and adds a MAC header to transmit the data packet across the wireless network. Embodiments of the present disclosure described herein propose a variable size of the length field in the MAC header to reduce header overhead. The size of the length field in the MAC header can be determined based on one or more parameters associated with a connection between a transmitter and a receiver.

Figure 1:
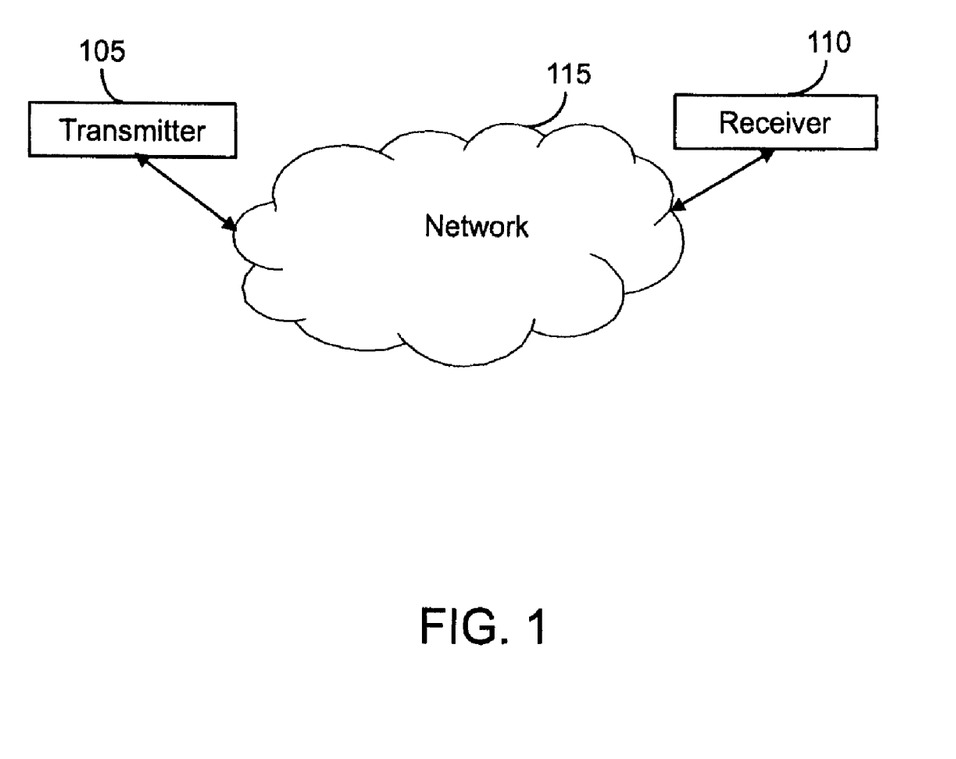
FIG. 1 illustrates a system, in accordance with one embodiment.

FIG. 1 illustrates a system in accordance with one embodiment.

As shown, the system, for example a communication system, includes a transmitter 105 in communication with a receiver 110 via a network 115. In some embodiments, the transmitter 105 is a base station and the receiver 110 is a mobile station. In other embodiments, the transmitter 105 is the mobile station and the receiver 110 is the base station. Examples of the network 115 includes, but are not limited to, a wireless network, a local area network, a wide area network, an evolved radio access network, an long term evolution (LTE) radio access network, a global system for mobile communications edge radio access network (GERAN), a universal mobile telecommunication system terrestrial radio access network (UTRAN), and a GSM radio access network (GRAN).

The transmitter 105 determines a size of a length field in a MAC header based on one or more parameters to transmit a MAC protocol data unit (PDU), which includes the MAC header, to the receiver 110. Examples of the parameters include, but are not limited to, one or more requirements of an application, one or more requirements specific to a connection between the transmitter 105 and the receiver 110, and a MAC PDU size.

In some embodiments, the size of the length field in the MAC header can be determined using one or more signaling messages, for example one or more signaling messages used for establishing a connection. The signaling messages used for establishing the connection can be modified to negotiate or determine the size of the length field in the MAC header. In some embodiments, a maximum MAC PDU size corresponding to the connection is determined by the transmitter 105 based on the parameters, and the size of the length field in the MAC header is then derived from the maximum MAC PDU size.

The receiver 110 receives the MAC PDU and determines the size of the length field in the MAC header based on a connection identifier in the MAC header. The size of the length field specific to a flow or the connection between the transmitter 105 and the receiver 110 is determined during initiation of the connection. Hence, both the receiver 110 and transmitter 105 are aware of the size of the length field to be used in the MAC header for the flow or the connection. The transmitter 105 can pack and the receiver 110 can parse the MAC header by using the connection identifier in the MAC header.

Figure 2A:
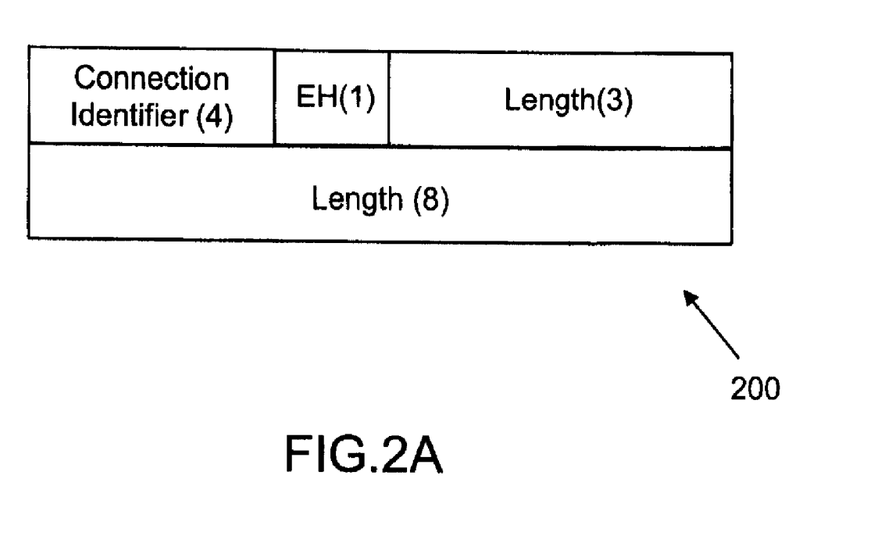
FIG. 2A is an exemplary representation illustrating a media access control header, in accordance with one embodiment.
Figure 2B:
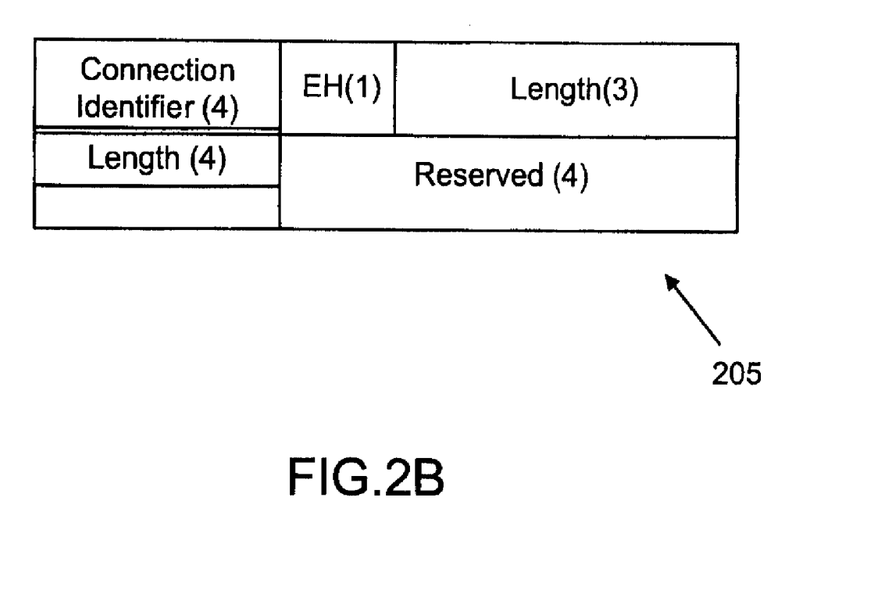
FIG. 2B is an exemplary representation illustrating a media access control header, in accordance with another embodiment.

FIG. 2A and FIG. 2B are exemplary representations illustrating a MAC header 200 and a MAC header 205 having different sizes of the length fields respectively. The MAC header 200 is defined for a connection with larger MAC PDUs between the transmitter 105 and the receiver 110, and the MAC header 205 is defined for a connection with smaller MAC PDUs between the transmitter 105 and the receiver 110. Each MAC header includes a connection identifier, an extended header (EH) presence indicator, and a length field. The connection identifier identifies the connection. The connection identifier can have a size of four bits. The EH presence indicator indicates a presence of an extended header following the MAC header. The length field indicates the length of the MAC PDU of the connection. The length field in the MAC header 200 can have a size of eleven bits, and the length field in the MAC header 205 can have a size of seven bits. The four bits in the MAC header 205 are reserved bits. In some embodiments, the four bits in the MAC header 205 can be used for sequence numbering of the MAC PDU.

Figure 3A:
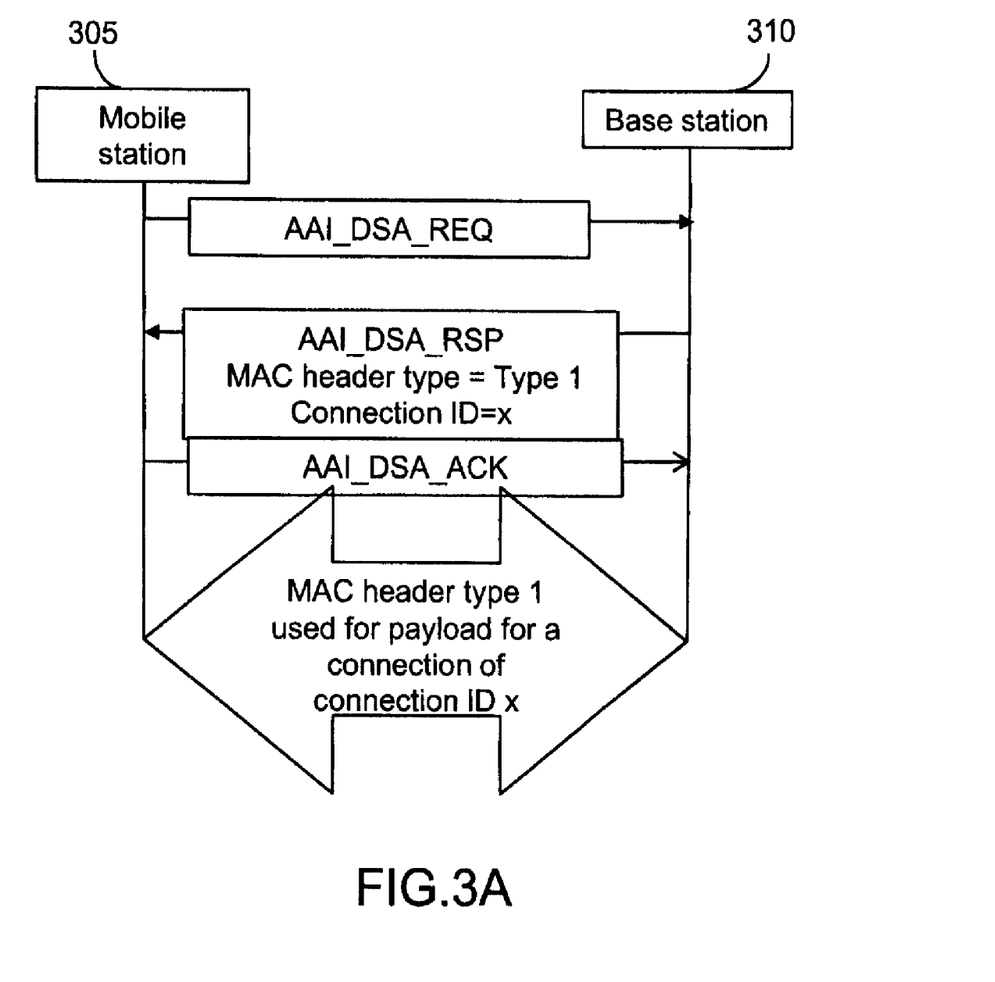
FIG. 3A is a flow diagram illustrating determination of a media access control header during a connection initiated by a mobile station with a base station, in accordance with one embodiment.
Figure 3B:
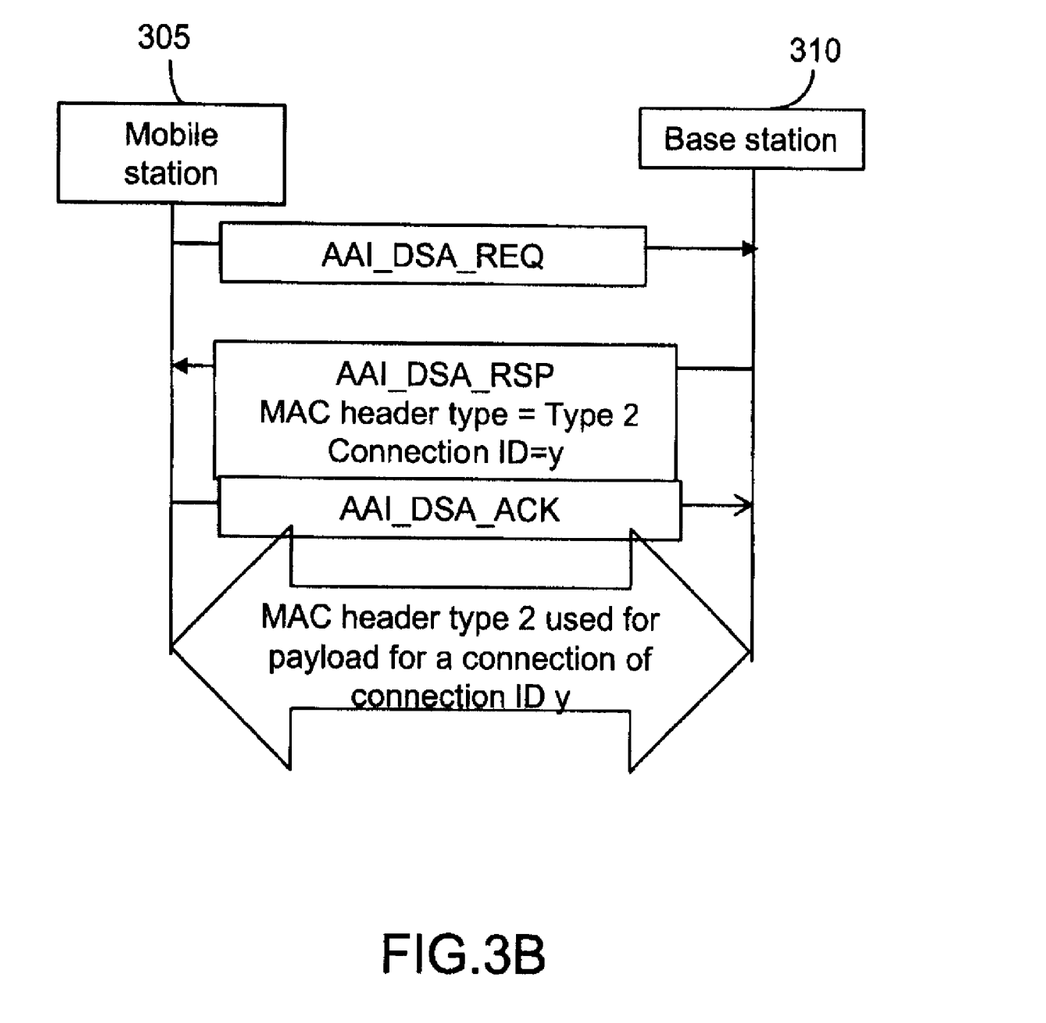
FIG. 3B is a flow diagram illustrating determination of a media access control header during a connection initiated by a mobile station with a base station, in accordance with another embodiment.

FIG. 3A and FIG. 3B are flow diagrams illustrating determination of the MAC header during a connection initiated by a mobile station 305 with a base station 310 in accordance with different embodiments. The mobile station 305 functions as the transmitter and initiates a connection with the base station 310 which functions as the receiver. FIG. 3A illustrates determination of the MAC header from one of a MAC header type 1 and a MAC header type 2 for a connection x. The mobile station 305 transmits an advanced air interface dynamic service addition request message (AAI_DSA_REQ) to the base station 310, to initiate to establish a connection. The base station 310 responds to the request by transmitting an advanced air interface dynamic service addition response message (AAI_DSA_RSP). The AAI_DSA_RSP includes a MAC header type indicating type 1 as a type of the MAC header and a connection identifier x. The connection identifier x represents the connection x. The mobile station 305 acknowledges the response by transmitting an advanced air interface dynamic service addition acknowledgement message (AAI_DSA_ACK) to the base station 310. The MAC header type 1 is then used in subsequent MAC PDUs carrying a payload of the connection x.

FIG. 3B illustrates determination of the MAC header from one of the MAC header type 1 and the MAC header type 2 for a connection y. The mobile station 305 transmits an advanced air interface dynamic service addition request message (AAI_DSA_REQ) to the base station 310, to initiate establishment of the connection. The base station 310 transmits an advanced air interface dynamic service addition response message (AAI_DSA_RSP) including a MAC header type indicating type 2 as a type of the MAC header and a connection identifier y. The connection identifier y represents the connection y. The mobile station 305 acknowledges the response by transmitting an advanced air interface dynamic service addition acknowledgement message (AAI_D-SA_ACK) to the base station 310. The MAC header type 2 is then used in subsequent MAC PDUs carrying a payload for the connection y.

Figure 4A:
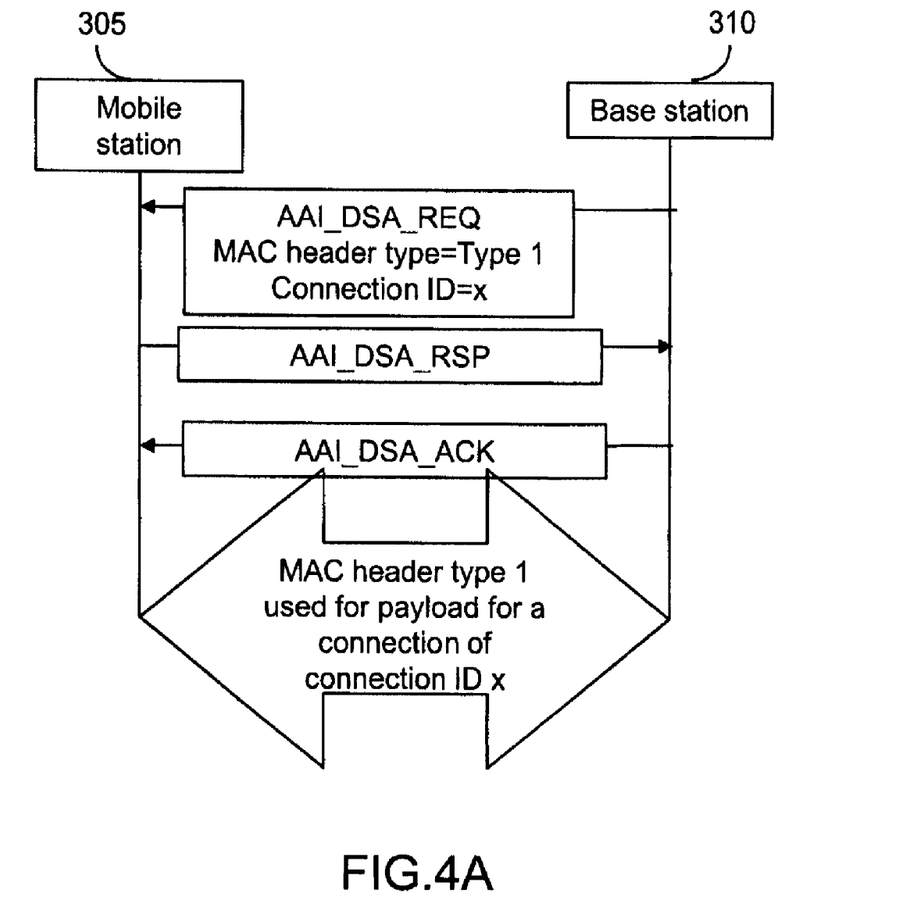
FIG. 4A is a flow diagram illustrating determination of a media access control header during a connection initiated by a base station with a mobile station, in accordance with one embodiment.
Figure 4B:
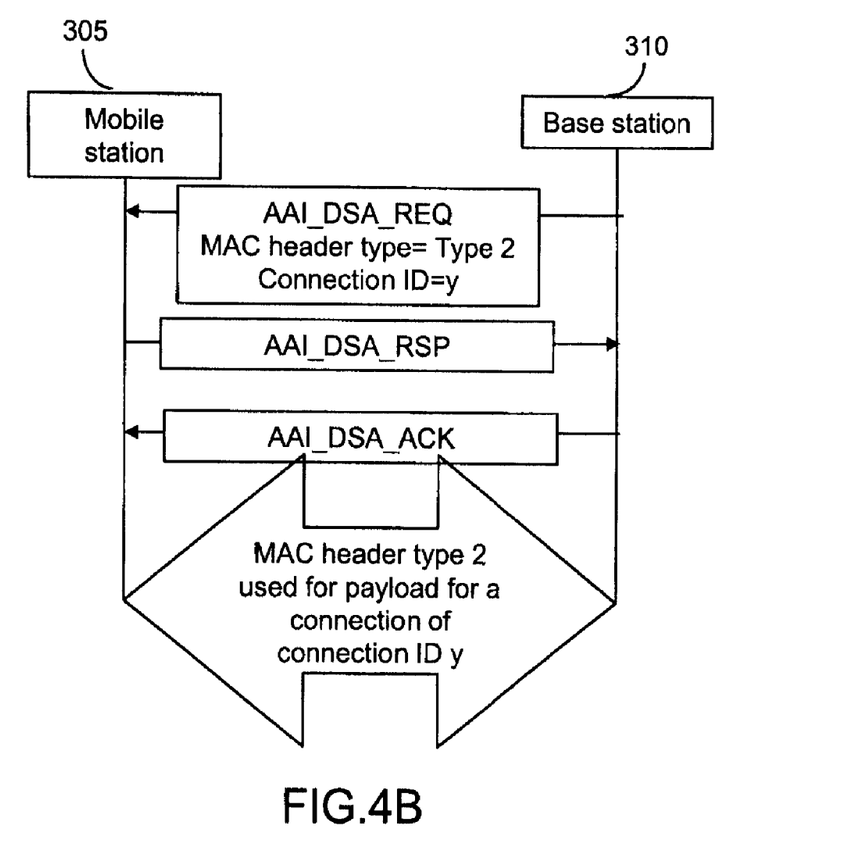
FIG. 4B is a flow diagram illustrating determination of a media access control header during a connection initiated by a base station with a mobile station, in accordance with another embodiment.

FIG. 4A and FIG. 4B are flow diagrams illustrating determination of the MAC header during a connection initiated by the base station 310 with the mobile station 305 in accordance with different embodiments. The base station 310 functions as the transmitter and initiates a connection with the mobile station 305 functioning as a receiver. FIG. 4A illustrates determination of the MAC header from one of the MAC header type 1 and the MAC header type 2 for a connection x. The base station 310 transmits an advanced air interface dynamic service addition request (AAI_DSA_REQ) to the mobile station 305 to initiate establishment of the connection. The mobile station 305 responds to the request by transmitting an advanced air interface dynamic service addition response message (AAI_DSA_RSP) including a MAC header type indicating type 1 as a type of the MAC header and a connection identifier x. The connection identifier x represents the connection. The base station 310 acknowledges the response by transmitting an advanced air interface dynamic service addition acknowledgement message (AAI_D-SA_ACK) to the mobile station 305. The MAC header type 1 is then used in subsequent MAC PDUs carrying a payload of the connection x.

FIG. 4B illustrates determination of the MAC header from one of the MAC header type 1 and the MAC header type 2 for a connection y. The base station 310 transmits an advanced air interface dynamic service addition request message (AAI_D-SA_REQ) to the mobile station 305 to initiate establishment of the connection. The mobile station 305 transmits an advanced air interface dynamic service addition response message (AAI_DSA_RSP) including a MAC header type indicating type 2 as a type of the MAC header and a connection identifier y. The connection identifier y represents the connection y. The base station 310 acknowledges the response by transmitting an advanced air interface dynamic service addition acknowledgement message (AAI_D-SA_ACK) to the mobile station 305. The MAC header type 2 is used in subsequent MAC PDUs carrying a payload for the connection y.

Figure 5:
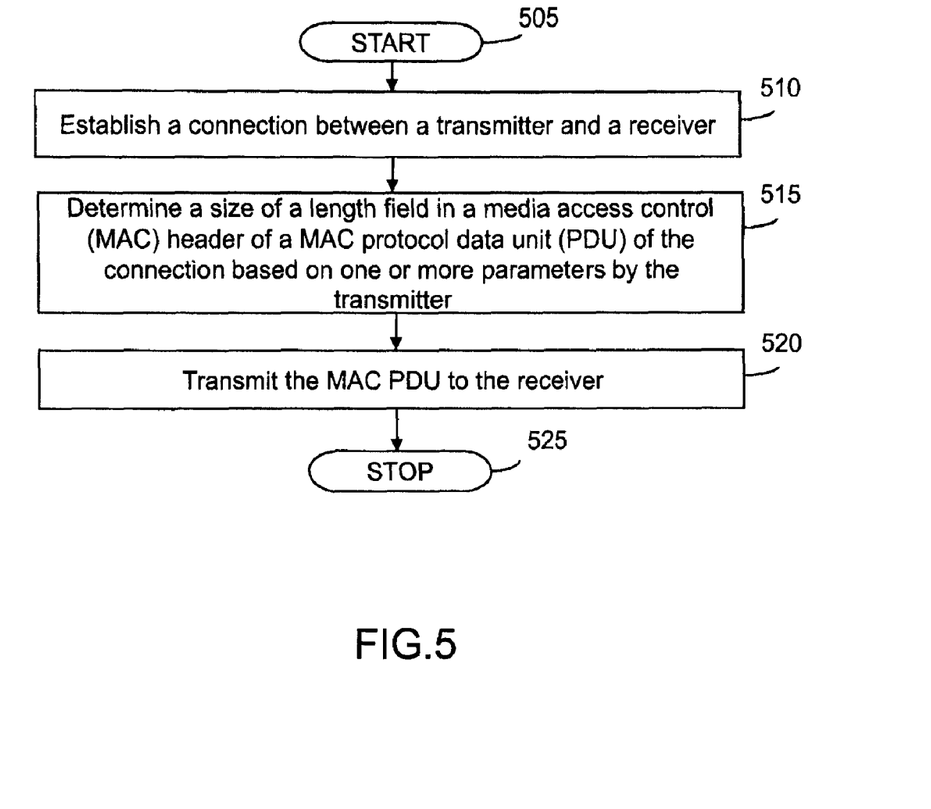
FIG. 5 is a flowchart illustrating a method for configuring a media access control header to reduce a header overhead, in accordance with one embodiment.

FIG. 5 is a flowchart illustrating a method for configuring a media access control header to reduce a header overhead in accordance with one embodiment.

The method starts at step 505.

At step 510, a connection is established between a transmitter, for example a mobile station, and a receiver, for example a base station. The transmitter prepares a connection payload to be sent to the receiver in a media access control (MAC) protocol data unit (PDU).

At step 515, size of a length field in the MAC header, in the MAC PDU, is determined by the transmitter corresponding to the connection payload. The size of the length field is determined by the transmitter based on one or more parameters. Examples of the parameters include, but are not limited to, one of a plurality of requirements of an application, a plurality of requirements specific to the connection between the transmitter and the receiver, and a MAC PDU size. The size of the length field can be a part of a quality of service parameter for the connection.

In some embodiments, the size of the length field in the MAC header is determined using one or more signaling messages, for example one or more messages used for establishing a connection. The messages used for establishing the connection can be modified to negotiate or determine the size of the length field in the MAC header. In some embodiments, a maximum MAC PDU size corresponding to the connection is determined based on the parameters, and the size of the length field in the MAC header is then derived from the maximum MAC PDU size. The transmitter prepares the MAC header based on the size of the length field and attaches the MAC header to the MAC PDU. The MAC PDU is further transferred to a physical layer for transmission to the receiver.

In some embodiments, the size of the length field in the MAC header of the MAC PDU of the connection is used for transmitting each MAC PDU of the connection.

In some embodiments, the size of the length field in the MAC header can be statically configured by reserving one or more connection identifiers during establishing of the connection. Each connection identifier corresponds to a size of the length field. Consider for example, two sizes of the length fields are length1 and length2. A connection identifier x is reserved for length1. When a connection is established with the connection identifier x, the MAC header with the size of the length field equal to length1 is then used in the MAC PDUs carrying the payload of the connection x. Connections other than the connection identified by connection x use the MAC header with the size of the length field equal to length2.

At step 520, the MAC PDU is transmitted to the receiver via the physical layer. The receiver receives the MAC PDU and determines the size of the length field in the MAC header of the MAC PDU by reading the connection identifier in the MAC header. The receiver then decodes the MAC header based on the size of the length field. A payload is further processed based on the MAC header.

The method stops at step 525.

Figure 6:
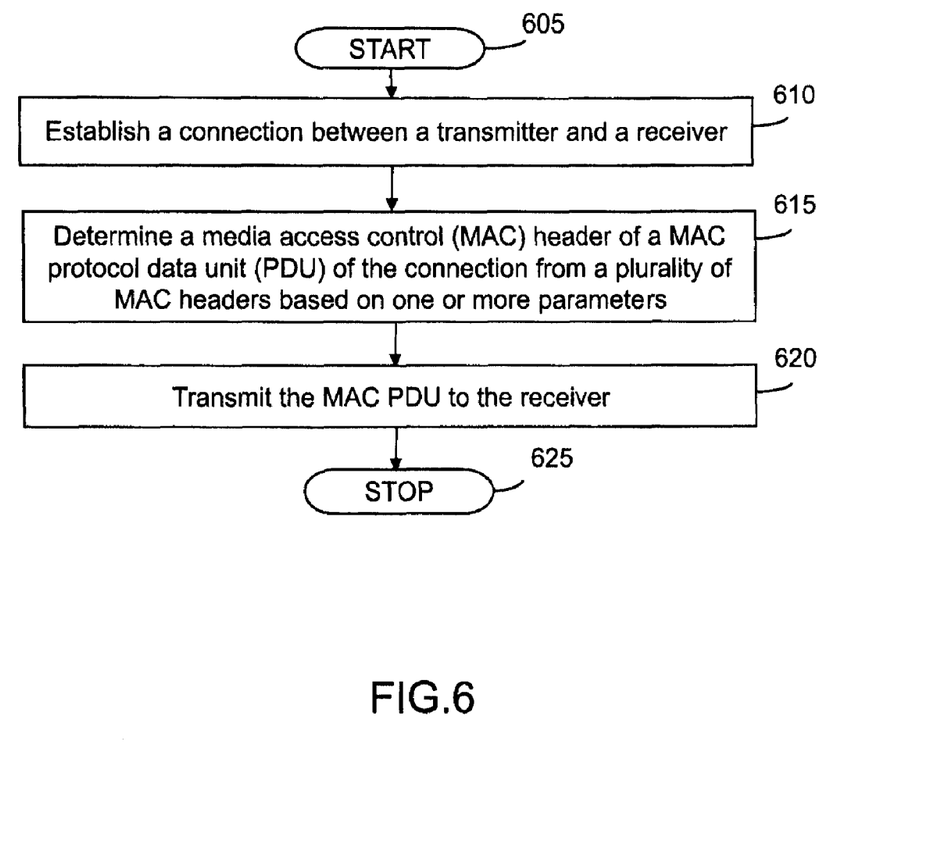
FIG. 6 is a flowchart illustrating a method for configuring a media access control header to reduce a header overhead, in accordance with another embodiment.

FIG. 6 is a flowchart illustrating a method for configuring a media access control header to reduce a header overhead in accordance with another embodiment.

The method starts at step 605.

At step 610, a connection is established between a transmitter, for example a mobile station, and a receiver, for example a base station. The transmitter prepares a payload to be sent to the receiver in a media access control (MAC) protocol data unit (PDU).

At step 615, the MAC header of the MAC PDU of the connection is determined from a plurality of MAC headers by the transmitter. The MAC headers, each having different sizes of length fields, are defined. An appropriate MAC header of the MAC PDUs of the connection is chosen based on one or more parameters of the connection. In some embodiments, a MAC header is chosen from the MAC headers using the signaling messages during establishing of the connection. The signaling messages carry a MAC header type to be used for the connection being established.

In some embodiments, the MAC header of the MAC PDU of the connection is used for transmitting each MAC PDU of the connection.

In some embodiments, the signaling messages carry the MAC header type to be used for the connection being established. One or more connection identifiers can be reserved for a particular MAC header during establishing of the connection. For example, consider two MAC headers, MAC header type1 and MAC header type2. A connection identifier x is reserved for a MAC header type 1. When a connection is established with the connection identifier x, the MAC header type 1 is then used in the MAC PDUs carrying the payload of the connection x. Connections other than the connection identified by the connection x use the MAC header type 2.

At step 620, the MAC PDU is transmitted to the receiver via a physical layer. The receiver receives the MAC PDU and determines the MAC header of the MAC PDU based on the connection identifier in the MAC header. The receiver decodes the MAC header and a payload is further processed based on the MAC header.

The method stops at step 625.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

We claim:

1. A method for transmitting a media access control header in a wireless communication, the method comprising:
    establishing a connection between a transmitter and a receiver;
    determining, by the transmitter, a size of a length field in the media access control (MAC) header of a MAC protocol data unit (PDU) of the connection based on one or more parameters; and
    transmitting the MAC PDU having the MAC header to the receiver,
    wherein the MAC PDU comprises the MAC header having one of a first MAC header type and a second MAC header type,
    the first MAC header type comprises a connection identifier, an Extended Header (EH) presence indicator indicating a presence of an extended header following the MAC header, and a first size of a length field indicating a length of the MAC PDU,
    the second MAC header type comprises a connection identifier, an EH presence indicator indicating a presence of an extended header following the MAC header, a second size of a length field indicating a length of the MAC PDU, and a sequence number of the MAC PDU, and
    the second size of the length field is smaller than the first size of the length field.

2. The method of claim 1, wherein determining the size of the length field in the MAC header comprises:
    determining the size of the length field in the MAC header from information included in one or more signaling messages;
    wherein the one or more signaling messages comprises the information indicating one of the first MAC header type and the second MAC header type.

3. The method of claim 2, wherein the size of the length field in the MAC header is determined from the one or more signaling messages used for establishing of the connection.

4. The method of claim 1, wherein determining the size of the length field in the MAC header comprises:
    deriving the size of the length field in the MAC header from a maximum size of the MAC PDU.

5. The method of claim 1, wherein determining the size of the length field in the MAC header comprises:
    determining the size of the length field in the MAC header from a specific connection identifier of the one or more connection identifiers,
    wherein the specific connection identifier is reserved for the connection during establishing of the connection.

6. The method of claim 1, wherein the one or more parameters comprise at least one of a plurality of requirements of an application, a plurality of requirements specific to the connection between the transmitter and the receiver, and a MAC PDU size.

7. An apparatus for transmitting a media access control header to reduce a header overhead, the apparatus comprising:
    a processor for determining a size of a length field in the media access control (MAC) header of a MAC protocol data unit (PDU) of a connection between a transmitter and a receiver, based on one or more parameters;
    a transmitting unit for transmitting the MAC PDU having the MAC header to the receiver,
    wherein the MAC PDU comprises the MAC header having one of a first MAC header type and a second MAC header type,
    the first MAC header type comprises a connection identifier, an Extended Header (EH) presence indicator indicating a presence of an extended header following the MAC header, and a first size of a length field indicating a length of the MAC PDU,
    the second MAC header type comprises a connection identifier, an EH presence indicator indicating a presence of an extended header following the MAC header, a second size of a length field indicating a length of the MAC PDU, and a sequence number of the MAC PDU, and
    the second size of the length field is smaller than the first size of the length field.

8. The apparatus of claim 7, wherein the one or more parameters comprise at least one of a plurality of requirements of an application, a plurality of requirements specific to a connection between the transmitter and the receiver, and a MAC PDU size.

9. The apparatus of claim 7, wherein the processor determines the size of the length field in the MAC header from information included in one or more signaling messages,
    wherein the one or more signaling messages comprises the information indicating one of the first MAC header type and the second MAC header type.

10. The apparatus of claim 9, wherein the size of the length field in the MAC header is determined from the one or more signaling messages used for establishing the connection.

11. The apparatus of claim 7, wherein the processor derives the size of the length field in the MAC header from a maximum size of the MAC PDU.

12. The apparatus of claim 7, wherein the processor determines the size of the length field in the MAC header from a specific connection identifier of the one or more connection identifiers, and
    wherein the specific connection identifier is reserved for the connection during establishing of the connection.

13. A method for receiving a media access control header in a wireless communication, the method comprising:
    establishing a connection between a transmitter and a receiver;
    determining, by the receiver, a size of a length field in the media access control (MAC) header of a MAC protocol data unit (PDU) of the connection based on one or more parameters;
    receiving the MAC PDU having the MAC header from the transmitter; and
    decoding the MAC header based on the size of the length field,
    wherein the MAC PDU comprises the MAC header having one of a first MAC header type and a second MAC header type,
    the first MAC header type comprises a connection identifier, an Extended Header (EH) presence indicator indicating a presence of an extended header following the MAC header, and a first size of a length field indicating a length of the MAC PDU, the second MAC header type comprises a connection identifier, an EH presence indicator indicating a presence of an extended header following the MAC header, a second size of a length field indicating a length of the MAC PDU, and a sequence number of the MAC PDU, and the second size of the length field is smaller than the first size of the length field.

14. The method of claim 13, wherein determining the size of the length field in the MAC header comprises:

determining the size of the length field in the MAC header from information included in one or more signaling messages, and wherein the one or more signaling messages comprises the information indicating one of the first MAC header type and the second MAC header type.

15. The method of claim 14, wherein the size of the length field in the MAC header is determined from the one or more signaling messages used for establishing of the connection.

16. The method of claim 13, wherein determining the size of the length field in the MAC header comprises:

deriving the size of the length field in the MAC header from a maximum size of the MAC PDU.

17. The method of claim 13, wherein determining the size of the length field in the MAC header comprises:

determining the size of the length field in the MAC header from a specific connection identifier of the one or more connection identifiers, wherein the specific connection identifier is reserved for the connection during establishing of the connection.

18. The method of claim 13, wherein the one or more parameters comprise at least one of a plurality of requirements of an application, a plurality of requirements specific to the connection between the transmitter and the receiver, and a MAC PDU size.

19. An apparatus for receiving a media access control header to reduce a header overhead, the apparatus comprising:

a processor for determining a size of a length field in the media access control (MAC) header of a MAC protocol data unit (PDU) of a connection between a transmitter and a receiver, based on one or more parameters; and a receiving unit for receiving the MAC PDU having the MAC header from the transmitter, wherein the processor decodes the MAC header based on the size of the length field, the MAC PDU comprises the MAC header having one of a first MAC header type and a second MAC header type, the first MAC header type comprises a connection identifier, an Extended Header (EH) presence indicator indicating a presence of an extended header following the MAC header, and a first size of a length field indicating a length of the MAC PDU, the second MAC header type comprises a connection identifier, an EH presence indicator indicating a presence of an extended header following the MAC header, a second size of a length field indicating a length of the MAC PDU, and a sequence number of the MAC PDU, and the second size of the length field is smaller than the first size of the length field.

20. The apparatus of claim 19, wherein the one or more parameters comprise at least one of a plurality of requirements of an application, a plurality of requirements specific to a connection between the transmitter and the receiver, and a MAC PDU size.

21. The apparatus of claim 20, wherein the processor determines the size of the length field in the MAC header from information included in one or more signaling messages, wherein the one or more signaling messages comprises information indicating one of the first MAC header type and the second MAC header type.

22. The apparatus of claim 19, wherein the size of the length field in the MAC header is determined from the one or more signaling messages used for establishing the connection.

23. The apparatus of claim 19, wherein the processor derives the size of the length field in the MAC header from a maximum size of the MAC PDU.

24. The apparatus of claim 19, wherein the processor determines the size of the length field in the MAC header from a specific connection identifier of the one or more connection identifiers, wherein the specific connection identifier is reserved for the connection during establishing of the connection.

* * * * *